(12) United States Patent
Heuver

(10) Patent No.: US 9,109,644 B2
(45) Date of Patent: Aug. 18, 2015

(54) FRICTION BRAKE FOR A DOG CLUTCH

(71) Applicant: FORD GLOBAL TECHNOLOGIES, LLC, Dearborn, MI (US)

(72) Inventor: Bradley R. Heuver, South Lyon, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 182 days.

(21) Appl. No.: 13/926,157

(22) Filed: Jun. 25, 2013

(65) Prior Publication Data

US 2014/0374208 A1    Dec. 25, 2014

(51) Int. Cl.
*F16D 23/04*    (2006.01)
*F16D 67/04*    (2006.01)
F16D 63/00    (2006.01)

(52) U.S. Cl.
CPC ............. *F16D 23/04* (2013.01); *F16D 63/006* (2013.01); *F16D 67/04* (2013.01)

(58) Field of Classification Search
CPC ....................................................... F16D 23/04
See application file for complete search history.

(56) References Cited

U.S. PATENT DOCUMENTS

| | | | |
|---|---|---|---|
| 2,044,930 A | 6/1936 | Zubaty | |
| 2,554,740 A * | 5/1951 | Jellis et al. | 451/250 |
| 3,175,662 A | 3/1965 | Henderson | |
| 4,817,773 A | 4/1989 | Knodel et al. | |
| 5,234,389 A | 8/1993 | Goates | |
| 5,267,917 A | 12/1993 | Kadotani et al. | |
| 6,149,543 A | 11/2000 | Breen | |
| 6,966,805 B1 | 11/2005 | Caldwell | |
| 7,223,198 B2 * | 5/2007 | Kimes et al. | 475/331 |
| 7,415,905 B2 | 8/2008 | Maguire et al. | |
| 7,534,188 B2 | 5/2009 | Pritchard et al. | |
| 8,584,823 B2 * | 11/2013 | Phillips et al. | 192/48.5 |
| 2004/0055844 A1 * | 3/2004 | Ebenhoch et al. | 192/53.1 |
| 2008/0047798 A1 * | 2/2008 | Wittkopp et al. | 192/53.34 |
| 2012/0103748 A1 | 5/2012 | Drabek | |
| 2012/0186929 A1 | 7/2012 | Falcone et al. | |

FOREIGN PATENT DOCUMENTS

JP    2007332986    12/2007

* cited by examiner

*Primary Examiner* — Ramya Burgess
*Assistant Examiner* — Mark Manley
(74) *Attorney, Agent, or Firm* — James Dottavio; MacMillan, Sobanski & Todd, LLC

(57) ABSTRACT

A dog clutch, includes a first ring secured to an overrunning brake rotatable race, including first teeth, a first disc, the second ring angularly displaceable relative to the discs, a non-rotating, axially displaceable second ring including second teeth engageable with the first teeth and a second disc engageable with the first disc, a first spring urging the discs into mutual contact, and a second spring urging the first and second rings apart.

20 Claims, 3 Drawing Sheets

FRICTION BRAKE FOR A DOG CLUTCH

BACKGROUND OF THE INVENTION

1. Field of the Invention

This invention relates generally to a non-synchronized friction brake for actuating a dog clutch 2. Description of the Prior Art While engaging the teeth of a dog clutch while its components are rotating in an automotive vehicle, an objectionable clash can be heard and felt. This clash can be eliminated if the teeth are engaged while the components are stationary.

A full synchronizer would represent a conventional solution to the clash problem, but a full synchronizer requires a large number of parts and relatively high cost. Empirical evidence shows that full synchronization is not needed when large clutch apply pressures are available for dog clutch actuation.

A need exists in the industry, however, for a technique that stops rotation of the dog clutch in the most cost effective manner and minimizes hydraulic drag of a rotating friction element when the dog clutch is open.

SUMMARY OF THE INVENTION

A dog clutch, includes a first ring secured to an overrunning brake rotatable race, including first teeth, a first disc, the second ring angularly displaceable relative to the discs, a non-rotating, axially displaceable second ring including second teeth engageable with the first teeth and a second disc engageable with the first disc, a first spring urging the discs into mutual contact, and a second spring urging the first and second rings apart.

Since the rotating parts are spinning with inertia force and drag due to an open clutch pack, the energy that must be dissipated is small, and the likelihood of the energy being dissipated is high.

The dog clutch slows rotation of the first race of the dog clutch prior to engagement of the dog teeth by forcing the discs into frictional contact, one of the discs being held against rotation.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
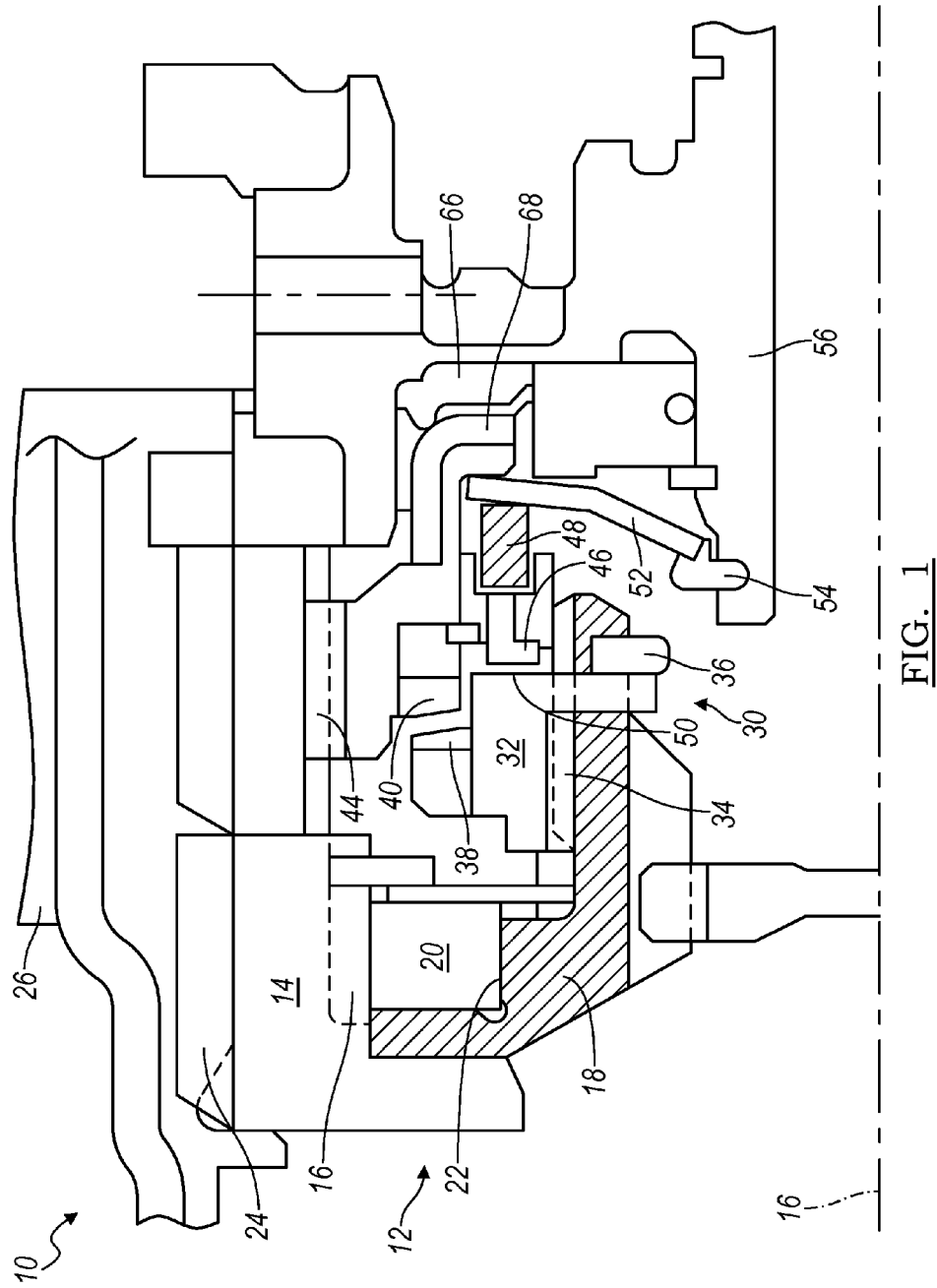
FIG. 1 is a cross section side view of a portion of the kinematic arrangement of an automatic transmission.

FIG. 1 is a cross section side view of an assembly 10, which is a portion of the kinematic arrangement of an automatic transmission. The assembly 10 includes a one-way or overrunning brake 12 having an outer ring 14 formed with cams distributed angularly about an axis 16, a rotatable inner race 18, and a torque transmitting members 20, such as rockers, each torque transmitting member being supported in a pocket 22 of the inner race and able to pivot into and out of engagement with one of the cams. When overrunning brake 12 is engaged, race 18 is held fixed against rotation through the rockers and cams due to the outer race 14 being fixed by a spline connection 24 to a transmission housing 26. When overrunning brake 12 is disengaged, inner race 18 can spin freely relative to the outer race 14.

Assembly 10 further includes a dog clutch 30, which includes an inner or first ring member 32, driveably connected by an axial spline 34 to the inner race 18 for rotation as a unit with the inner race and fixed against axial displacement by a snap ring 36. The first ring 32 includes first, axially-directed dog teeth 38, which are spaced angularly about axis 16 and are aligned with mating axially-directed dog teeth 40 on the second ring 42 of the dog clutch 30.

The second ring 42 of dog clutch 30 is driveably connected by an axial spline 44 to the housing 26. A friction disc 46 is supported on the second ring 42 for axial displacement relative to the first ring member 32. A coiled compression spring 48 continually urges friction disc 46 toward contact with a friction surface 50, which is supported on the first ring 32 and aligned with the friction disc 46. A Belleville spring 52, secured by a snap ring 54 to the center support 56 of the housing 26 and contacting the second ring 42, continually urges the second ring rightward away from the first ring 32.

Figure 2:
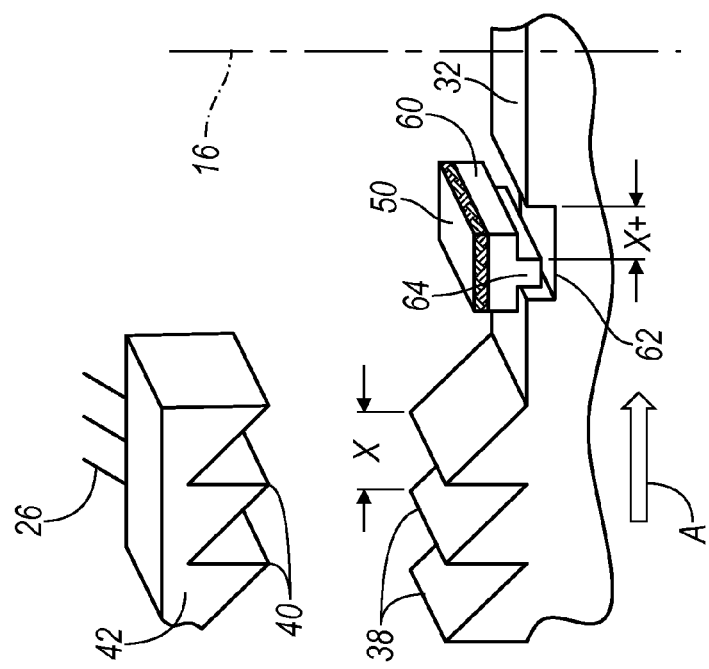
FIG. 2 is a perspective view showing the teeth of the dog clutch disengaged and a friction disc is a slot on the first disc.

FIG. 2 illustrates that friction surface 50 is supported on a disc 60, which is located and retained in an annular slot 62 formed on the first ring 32. The radial width of annular slot 62 is greater than the radial dimension of the portion 64 of disc 60 that is located in the slot, thereby permitting angular displacement of the first ring 32 about axis 16 relative to disc 60 and friction disc 46 when the discs are engaged mutually.

Since the rotating parts are spinning with inertia force and drag due to an open clutch pack, the energy that must be dissipated is small, and the likelihood of the energy being dissipated is high.

When hydraulic fluid in cylinder 66 is pressurized, the second ring 42 is displaced axially leftward, thereby carrying its dog teeth 40 toward dog teeth 38. Before the dog teeth 38, 40 engage mutually, the first ring 32 may rotate about axis 16 along a radially distance x in the direction of arrow A from the position shown in FIG. 2, in order for the crests of clutch teeth 38 to become aligned with the valleys between clutch teeth 40, while the positions of discs 46, 60 and frictional contact between the discs is maintained.

Figure 3:
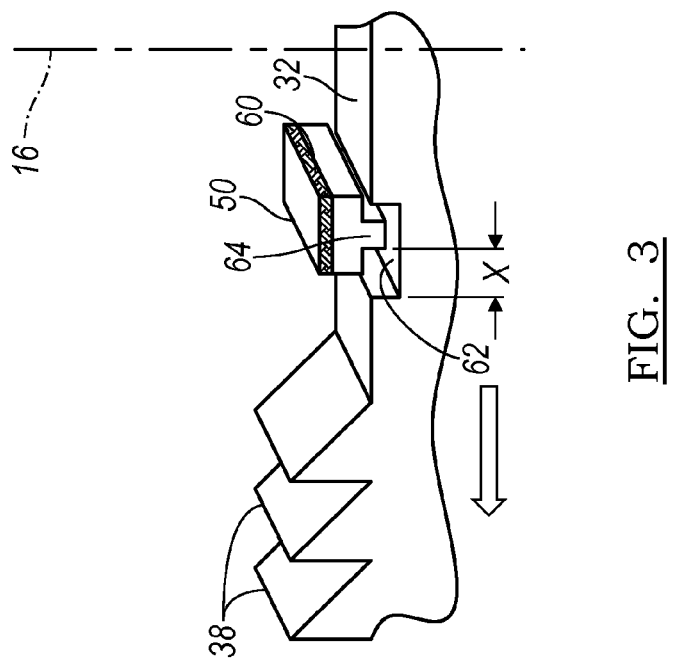
FIG. 3 is a perspective view showing the first ring having been displaced angularly relative to its position in FIG. 2.

FIG. 3 shows that first ring 32 has been displaced angularly through radial dimension x, such that the crests of clutch teeth 38 have become aligned with the valleys between clutch teeth 40, thereby allowing the first ring 32 and second ring 42 to engage, while the radial position of discs 46, 60 and frictional contact between the discs is maintained.

Figure 4:
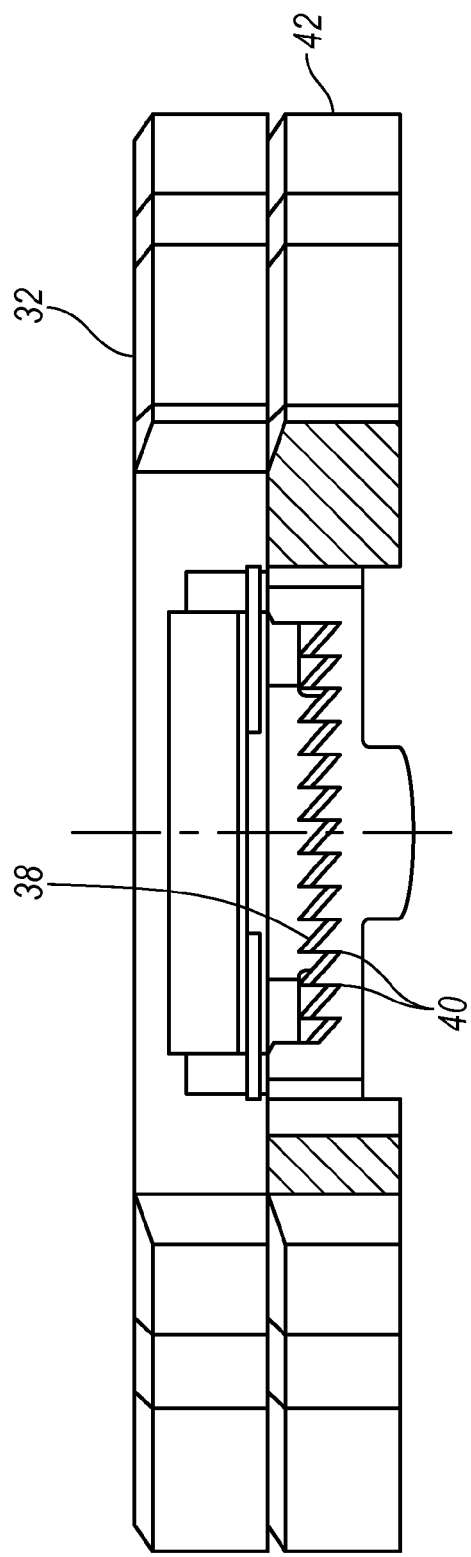
FIG. 4 is a top view of the clutch showing the dog teeth engaged.

FIG. 4 is a top view of the clutch showing the dog teeth engaged.

While the one-way brake 12 overruns, the dog clutch 30 and a friction brake are fully retracted from the rotating inner race 18 of overrunning brake 12, providing a minimum spin loss condition. When engagement of the dog clutch 30 is required, piston 68 is first actuated leftward by pressure in cylinder 66 in order to actuate the friction brake apply spring 48. The force needed to compress the apply spring 48 is sufficiently greater than the force needed to actuate the second ring 42; therefore, the dog teeth 38, 40 do not yet engage the rotating, slowing first ring 32. The hydraulic force on piston 68 is then applied through the second ring 42 and the engaged friction discs 46, 60 to the first ring 32.

The mass of the rotating assembly 10 is known, as is the approximate starting speed, making the energy of the assembly a known value. The force on piston 68 and its pressurized area are also known, making the length of time needed to bring the first race 18 to zero speed also known. After this length of time has passed, the piston pressure is increased to the point where the force of spring 52 is exceeded, and the dog clutch 30 completes its engagement with the first race 18 at zero speed.

When the first ring 32 of the dog clutch 30 is rotating, it pulls the friction disc 60 to the side of the annular slot 62. When the first ring 32 is at zero speed and the second ring 42 starts to engage the first ring, the saw tooth profile of the dog teeth 38 rotates the first ring 32 in the opposite direction relative to its overrunning condition. The annular slot 62 allows the first ring 32 to rotate without altering the angular position of the mutually engaged friction discs 46, 60.

The dog clutch 30 is disengaged upon venting cylinder 66, which allows spring 52 to move the second ring 42 rightward away from the first ring 32, thereby disengaging the meshing dog teeth 38, 40.

In accordance with the provisions of the patent statutes, the preferred embodiment has been described. However, it should be noted that the alternate embodiments can be practiced otherwise than as specifically illustrated and described.

The invention claimed is:

1. A clutch, comprising:
   a first ring secured to a rotatable race of an overrunning brake, including first teeth and a first disc movable relative to the first ring;
   a non-rotating, axially displaceable second ring including second teeth engageable with the first teeth, a second disc engageable with the first disc, the second ring angularly displaceable relative to both of the discs;
   a spring urging the discs into mutual contact.

2. The clutch of claim 1, further comprising a second spring, contacting the first spring, urging the first and second rings apart.

3. The clutch of claim 1, further comprising:
   a cylinder communicating with a source of hydraulic pressure;
   a piston located in the cylinder for displacing the second ring toward the first ring due to pressure in the cylinder.

4. The clutch of claim 1, wherein the first disc is supported on the first ring such that a radial position of the first and second discs when engaged mutually remains constant when an angular position of the first ring varies with respect to an annular position of the second ring.

5. The clutch of claim 1, wherein:
   the first ring is formed with a slot containing the first disc, a radial dimension of the slot permitting angular displacement of the first ring relative to both of the first and second discs, said displacement permitting the first teeth to engage the second teeth.

6. The clutch of claim 1, wherein:
   a radial position of the second disc is constant;
   a radial position of the first disc when engaged with the second disc is constant; and
   angular displacement of the first ring can vary relative to both of the first and second discs when mutually engaged.

7. The clutch of claim 1, wherein the overrunning brake includes:
   a nonrotatable race secured against rotation;
   a torque transmitting member alternately engaged with the nonrotatable race and the rotatable race, thereby holding the rotatable race against rotation, and disengaged from the nonrotatable race, thereby allowing the rotatable race to rotate.

8. The clutch of claim 1 wherein the first disc includes a first friction surface that faces directly axially, and the second disc includes a second friction surface that faces directly axially and selectively engages the first friction surface.

9. The clutch of claim 1 wherein the first disc includes a first friction surface that is planar, and the second disc includes a second friction surface that is planar and selectively engages the first friction surface.

10. The clutch of claim 1 wherein the second teeth are configured to move into and out of engagement with the first teeth without contacting any other element.

11. A clutch, comprising:
    a first ring secured to a rotatable race of an overrunning brake, including first teeth and a first disc having a planar first friction surface;
    a non-rotating, axially displaceable second ring including second teeth engageable with the first teeth, a second disc having a planar second friction surface engageable with the first friction surface, the second ring angularly displaceable relative to the discs;
    a spring urging the discs into mutual contact.

12. A clutch, comprising:
    a first ring secured to a rotatable race of an overrunning brake, including first teeth and a first disc having a planar first friction surface;
    a non-rotating, axially displaceable second ring including second teeth engageable with the first teeth, a second disc having a planar second friction surface engageable with the first friction surface, the second ring angularly displaceable relative to the discs;
    a spring urging the discs into mutual contact.

13. The clutch of claim 12, further comprising a second spring, in surface contact with the spring, urging the first and second rings apart.

14. The clutch of claim 12, including a servo configured to move the second ring toward the first ring, wherein the servo comprises:
    a cylinder communicating with a source of hydraulic pressure;
    a piston located in the cylinder for displacing the second ring toward the first ring due to pressure in the cylinder.

15. The clutch of claim 11, wherein the first disc is supported on and movable relative to the first ring such that a radial position of the first and second discs when engaged mutually remains constant when an angular position of the first ring varies with respect to an annular position of the second ring.

16. The clutch of claim 12, wherein:
    the first ring is formed with a slot containing the first disc, a radial dimension of the slot permitting angular displacement of the first ring relative to both of the first and second discs, said displacement permitting the first teeth to engage the second teeth.

17. The clutch of claim 12, wherein:
    a radial position of the second disc is constant;
    a radial position of the first disc when engaged with the second disc is constant; and
    angular displacement of the first ring can vary relative to both of the first and second discs when mutually engaged.

18. The clutch of claim 12, wherein the overrunning brake includes:

a nonrotatable race secured against rotation;

a torque transmitting member alternately engaged with the nonrotatable race and the rotatable race, thereby holding the rotatable race against rotation, and disengaged from the nonrotatable race, thereby allowing the rotatable race to rotate.

19. A method for operating a clutch, comprising:

securing a first ring including first teeth and a first disc to a rotatable race of an overrunning brake;

securing against rotation an axially displaceable second ring including second teeth engageable with the first teeth and a second disc engageable with the first disc;

urging the discs into mutual contact;

moving the second ring toward the first ring;

after mutual contact of the discs, angularly displacing the second ring relative to both of the discs, and displacing the first disc relative to the first ring, such that the teeth engage mutually.

20. The method of claim 19, further comprising:

discontinuing movement of the second ring toward the first ring; and elastically urging the teeth to mutually disengage.

\* \* \* \* \*